(12) United States Patent
Thiebot et al.

(10) Patent No.: US 9,336,434 B2
(45) Date of Patent: May 10, 2016

(54) METHOD FOR DETECTING A TRUE FACE
(71) Applicant: MORPHO, Issy-les-Moulineaux (FR)
(72) Inventors: Alain Thiebot, Issy-les-Moulineaux (FR); Benjamin Peyron-Neaud, Issy-les-Moulineaux (FR); Benoît Thouy, Issy-les-Moulineaux (FR); Florence Guillemot, Issy-les-Moulineaux (FR); Gilles Monteilliet, Issy-les-Moulineaux (FR)
(73) Assignee: MORPHO, Issy-les-Moulineaux (FR)
( * ) Notice: Subject to any disclaimer, the term of this patent is extended or adjusted under 35 U.S.C. 154(b) by 0 days.
(21) Appl. No.: 14/434,152
(22) PCT Filed: Jun. 20, 2014
(86) PCT No.: PCT/EP2014/063038
§ 371 (c)(1),
(2) Date: Apr. 8, 2015
(87) PCT Pub. No.: WO2014/206887
PCT Pub. Date: Dec. 31, 2014
(65) Prior Publication Data
US 2015/0261999 A1 Sep. 17, 2015
(30) Foreign Application Priority Data
Jun. 25, 2013 (FR) ...................................... 13 56033
(51) Int. Cl.
*H04N 9/73* (2006.01)
*H04N 5/235* (2006.01)
*G06K 9/00* (2006.01)
*G06K 9/20* (2006.01)
(52) U.S. Cl.
CPC ........ *G06K 9/00288* (2013.01); *G06K 9/00248* (2013.01); *G06K 9/00255* (2013.01); *G06K 9/00906* (2013.01); *G06K 9/2018* (2013.01); *G06K 9/2036* (2013.01)
(58) Field of Classification Search
CPC ............ G06K 9/00268; G06K 9/4661; G06K 9/00362; G06K 9/2018; G06K 9/2036
See application file for complete search history.

(56) References Cited

U.S. PATENT DOCUMENTS 7,620,218 B2 * 11/2009 Steinberg ........... G06K 9/00228
382/103
2008/0279423 A1 * 11/2008 Zhang ................ G06K 9/00268
382/118
(Continued)

FOREIGN PATENT DOCUMENTS

WO 2008/108871 A2 9/2008

OTHER PUBLICATIONS

Chen et al; Invariant Pattern Recognition Using Radon, Dual-Tree Complex Wavelet and Fourier Transforms; 2009; Pattern Recognition; vol. 42; pp. 2013-2019.
(Continued)

*Primary Examiner* — Aung S Moe
*Assistant Examiner* — John H Morehead, III
(74) *Attorney, Agent, or Firm* — Oliff PLC; R. Brian Drozd

(57) ABSTRACT

Detecting a true face includes: capturing a parallel image of a face captured by a camera having a filter polarizing parallel to a polarization direction and an orthogonal image of the face captured by a camera's filter polarizing orthogonally to the polarization direction; computing a difference image from difference between the parallel and orthogonal images; filtering the difference image in wavelet packets on 5 levels, eliminating "low" resolution levels; dividing the filtered image into sub-images; the filtered image and each sub-image undergoes: a Fourier or discreet cosine transformation; and modelling during which the frequency decrease profile is modelled by a model of the power type (a.x^b+c); extracting, from the filtered image and each sub-image, texture characteristics of face surface specularities; analyzing, for each face region, coefficient "b" and the texture characteristics extracted regarding the model corresponding to said face region; and deciding the veracity of the face from the analysis.

3 Claims, 1 Drawing Sheet

(56) References Cited

U.S. PATENT DOCUMENTS

2011/0163163 A1* 7/2011 Rowe ............... G06K 9/00046
235/462.25
2014/0169643 A1* 6/2014 Todoroki ........... G06K 9/00288
382/118

OTHER PUBLICATIONS

Honma et al; "Liquid Crystal Polarization-Converting Devices for Edge and Corner Extractions of Images Using Optical Wavelet Transforms;" 2006; Applied Optics; vol. 45; No. 13; pp. 3083-3090.

Lai et al; "Face Recognition Using Holistic Fourier Invariant Features;" 2001; Pattern Recognition; vol. 34; pp. 95-109.

Yeh et al; "Personalized Photograph Ranking and Selection System;" 2010; Proceeding of the International Conference on Multimedia; pp. 211-220; XP055094029.

Liu et al; "Curvelet Based Image Reconstruction;" 2008; 9th International Conference on, IEEE; pp. 1035-1038; XP031369226.

Jul. 10, 2014 Search Report issued in International Application No. PCT/EP2014/063038.

* cited by examiner

METHOD FOR DETECTING A TRUE FACE

The present invention relates to a method for detecting a true face, as well as a device for detecting a true face implementing such a detection method.

It finds an application in the field of biometric recognition and in particular in the field of identification and authentication by the recognition of faces.

The recognition of a face is used for example for protecting installations and makes it possible to dispense with access codes or cards, which may be stolen or falsified. The use of this technology reinforces security since the probability that two persons have two identical faces is small.

Recognition of a face is based on the comparison of a template issuing from the image of the face of the user with a set of templates issuing from reference face images stored in a database.

Although the pirating of face recognition devices is difficult, it is not impossible.

This is because some pirates produce decoys, such as for example a photograph or mask on which the face to be imitated is reproduced. The pirate can then place the decoy in front of the acquisition device of the face recognition device, which is then deceived.

One object of the present invention is to propose a device for detecting a true face that does not have the drawbacks of the prior art.

To this end, a method is proposed for the detection of a true face by a detection device comprising at least one illumination means emitting an infrared flow polarised in a polarisation direction, a camera having a filter polarising orthogonally to the polarisation direction and a camera having a filter polarising parallel to the polarisation direction, a splitter blade placed between the face and the two cameras and intended to divide the light flow coming from the face into a light flow captured by the camera and a light flow captured by the camera, a processing unit and a database containing, for each face region, a truth model based on reference texture characteristic values, on reference coefficient values "b" and on correlations between these elements, said detection method comprising:

- a capture step during which a parallel image of the face illuminated by the illumination means is captured by the camera, and an orthogonal image of the face illuminated by the illumination means is captured by the camera,
- a difference step during which the processing unit computes a difference image resulting from the difference between the parallel image and the orthogonal image thus captured,
- a filtering step during which the processing unit generates a so-called filtered image by filtering said difference image in wavelet packets on 5 levels, eliminating the "low" resolution levels, 1 and 5,
- a division step during which the processing unit divides the image thus filtered into three filtered sub-images, the first corresponding to the forehead, the second corresponding to the nose and the third corresponding to the cheeks,
- a processing step during which said processing unit subjects the filtered image and each of the filtered sub-images to a process consisting of:
  - a Fourier transformation or a discreet cosine transformation in radial cumulative projection, by summing the energies belonging to the same frequency ring, for the purpose of defining a frequency decrease profile, and
  - modelling during which the frequency decrease profile is modelled in the form of a model of the power type $(a.x^b+c)$,
- an extraction step during which the processing unit extracts, from the filtered image and each of the filtered sub-images, texture characteristics relating to the specularities of the surface of the face,
- an analysis step during which the processing unit analyses, for each region of the face, the coefficient "b" thus calculated and the texture characteristics thus extracted compared with the truth model corresponding to said region of the face, and
- a decision-taking step during which the processing unit takes the decision concerning the veracity of the face from the result of the analysis step.

The invention also proposes a detection device comprising:
- at least one illumination means emitting an infrared flow polarised in a polarisation direction,
- a camera having a filter polarising orthogonally to the polarisation direction,
- a camera having a filter polarising parallel to the polarisation direction,
- a splitter blade placed between the face and the two cameras and intended to divide the light flow coming from the face into a light flow captured by the camera and a light flow captured by the camera,
- a database containing, for each face region, a truth model based on reference texture characteristic values, on reference coefficient "b" values and on correlations between these elements,
- a processing unit comprising:
- difference means provided for calculating a difference image resulting from the difference between the parallel image and the orthogonal image,
- filtering means provided for generating a filtered image by filtering the difference image in wavelet packets on 5 levels, eliminating the "low" resolution levels, 1 and 5,
- division means provided for dividing the filtered image into three filtered sub-images, the first corresponding to the forehead, the second corresponding to the nose and the third corresponding to the cheeks,
- transformation means provided for producing a Fourier transform or a discreet cosine transform in radial cumulative projection, by summing the energies belonging to the same frequency ring, and
- modelling means provided for modelling the frequency decrease profile in the form of a model of the power type $(a.x^b+c)$,
- extraction means provided for extracting, from the filtered image and each of the filtered sub-images, texture characteristics relating to the specularities of the surface of the face,
- analysis means provided for analysing, for each region of the face, the coefficient "b" calculated by the processing means and the texture characteristics extracted by the extraction means compared with the truth model corresponding to said region of the face, issuing from the learning and stored in the database, and
- decision-taking means provided for taking a decision concerning the veracity of the face from information supplied by the analysis means.

The features of the invention mentioned above, as well as others, will emerge more clearly from a reading of the following description of an example embodiment, said description being given in relation to the accompanying drawings, among which:

FIG. 1 shows a detection device 100 intended to detect whether the face 50 that is present in front of it is true or false.

Figure 1:
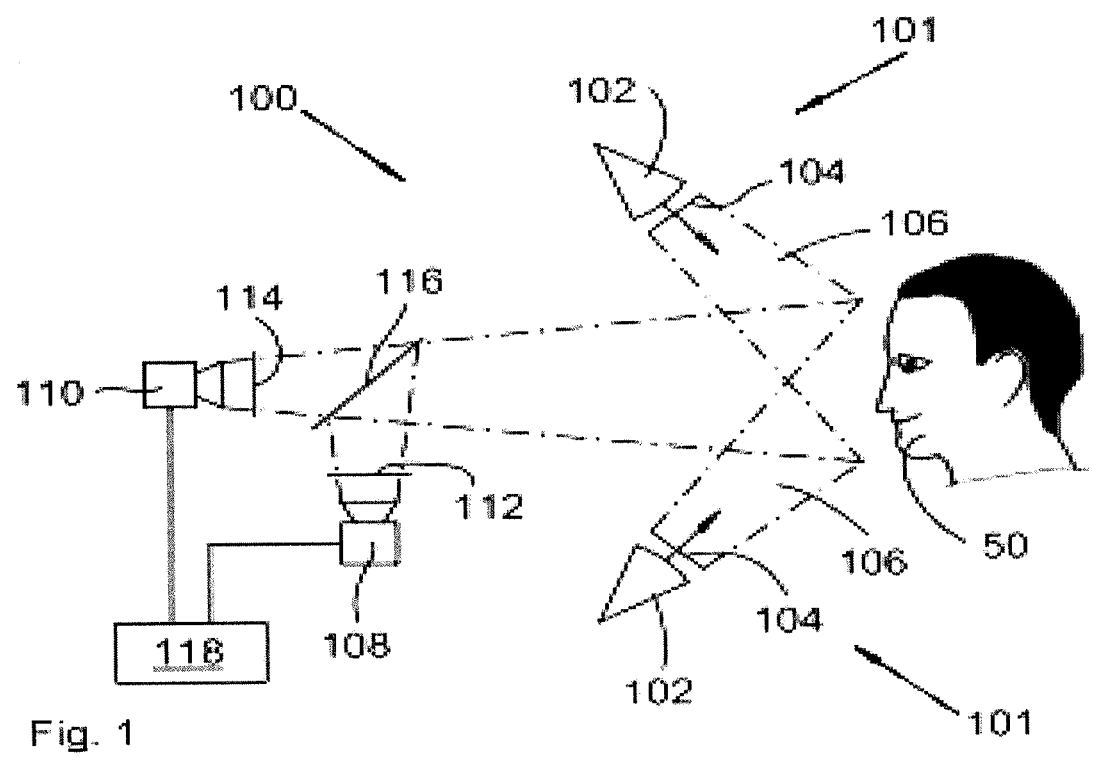
FIG. 1 depicts a device for detecting a true face according to the invention.

The detection device 100 comprises at least one illumination means 101.

In order to obtain better illumination of the face 1 and to limit shadow regions, there are two illumination means 101 disposed on either side of the face 50.

Each illumination means 101 comprises an infrared source 102 and a polariser 104 emitting a polarised infrared flow 106 in a polarisation direction. The polarised infrared flow 106 illuminates the face 50.

The detection device 100 also comprises two cameras 108 and 110. The two cameras 108 and 110 are calibrated so that the images obtained by the two cameras 108 and 110 are of the same intensity. Another solution consists of standardising the captured images.

The camera 108 has a filter 112 polarising orthogonally to the polarisation direction and the camera 110 has a filter 114 polarising parallel to the polarisation direction.

The detection device 100 also comprises a splitter blade 116 placed between the face 50 and the two cameras 108 and 110. The splitter blade 116 divides the light flow coming from the face 50 into two light flows, one of the light flows being captured by the camera 108 through the orthogonal polarising filter 112 and the other light flow being captured by the camera 110 through the parallel polarising filter 114.

The detection device 100 also comprises a processing unit 118 intended to process the images that it receives from the cameras 108 and 110.

The principle of the invention is based on the fact that an incident polarised infrared flow 106 that encounters a face 50 gives rise to the creation of three different infrared flows.

There is a first light flow issuing from the specular reflection, which is a direct reflection on the surface of the skin and takes the form of an infrared flow having polarisation parallel to that of the incident infrared flow 106.

There is a second light flow issuing from the diffusion on the surface of the skin. The surface diffusion takes the form of a non-coherent infrared flow including orthogonal and parallel polarisations.

There is a third light flow issuing from the diffusion in depth in the layers of the skin. This diffusion is a homogeneous Lambertian diffusion also including the orthogonal and parallel polarisations.

The image captured by the camera 108 having the orthogonal polarisation filter 112 is called the "orthogonal image" and the image captured by the camera 110 having the parallel polarising filter 114 is called the "parallel image".

Each camera 108, 110 is oriented so as to be able to capture at least one image of the face 50 illuminated by the illumination means 101.

The orthogonal image represents the infrared flow resulting from the surface diffusion and the diffusion in depth, but not the specular reflection.

The parallel image represents the infrared flow resulting from the surface diffusion, the diffusion in depth and the specular reflection.

Thus a difference image resulting from the difference between the parallel image and the orthogonal image represents only the infrared flow resulting from the specular reflection and therefore the specularities of the material constituting the face 50.

The polarisation of the light flow and the calculation of the difference between the parallel image and the orthogonal image improve the signal to noise ratio of the specularities by eliminating the deep local surface part. It is therefore possible to precisely analyse the forms and spatial distributions of the specularities, without being contaminated by the local surface diffusion and the deep diffuse component.

The specular reflection is characteristic of the optical properties of the reflective surface (skin or decoy) and the local relief of the reflective surface (smooth or having a specific relief). An analysis of the morphological and frequency characteristics of the specularities (their texture) can then be carried out in order to check that they are compatible with those of a real skin. Each miniscule protrusion on the skin will have high specularity at its top (light spot locally), each hollow (pore of the skin) will have less specularity. The distribution characteristics of these specularities (texture of the specularities) are therefore a measure of the image of the relief that must correspond to the one expected for a real skin.

An analysis of the texture characteristics of the specularities then makes it possible to distinguish a true face from a false face since the texture characteristics of the specularities of the skin are different from the materials used to make the decoys.

For example, when the face 50 is a decoy consisting of a material that is non-diffusing and non-penetrating for infrared (hard plastics, paper, textile printing, video on a Smartphone screen, PC, etc.) the diffusion in deep layers does not exist and the texture characteristics of the specularities recorded on the difference image are those of the material constituting the decoy, and these texture characteristics of the specularities do not corresponding to the texture characteristics of the specularities of skin.

For example, when the face 50 is a decoy consisting of a material that is penetrating and/or diffusing for infrared (elastomer, wax, paper), the texture characteristics of the specularities recorded on the difference image are relatively uniform over the whole of the difference image.

The specularities of the skin are variable according to the part of the face, and in particular the forehead specularities, the cheek specularities and the nose specularities are different, and it is therefore interesting to make a comparison of the characteristics of the texture of the specularities for each of these parts.

To compare the characteristics of the texture of the specularities recorded on the difference image with the characteristics of the texture of the specularities of the true skin, that is to say a true face, it is necessary to have characteristics of the texture of the reference specularities with which to compare them.

By means of the detection device 100, a parallel image and an orthogonal image are taken for each face 50 in a set containing true faces and false faces.

The difference image is then calculated by a difference between the parallel image and the orthogonal image.

The difference image then undergoes a processing that obtains a so-called filtered image and consists successively of:
  a filtering by wavelet packets on 5 levels,
    elimination of the "low" resolution and 1 levels for the purpose of eliminating the defects in uniformity of the lighting, and the elimination of level 5 for the purpose of attenuating the noise.

The filtered image is next divided into three filtered sub-images, one for the forehead, one for the nose and one for the cheeks.

The filtered image and each filtered sub-image then undergo:
- a Fourier transformation or a discreet cosine transformation (DCT) in radial cumulative projection, by summing the energies belonging to the same frequency ring, for the purpose of defining a decreasing profile of the frequencies, and
- a robust modelling of the frequency decrease profile in the form of a model of the power type (a.x^b+c) by a non-linear robust least squares method, and where the coefficient "b" is then characteristic of the frequency decrease.

For each filtered image and each filtered sub-image, a coefficient "b" is obtained.

From the filtered image and each filtered sub-image, texture characteristics of the specularities relating to the face 50 are extracted, as described in the following documents:
- "Evaluation of Texture Features for Content-Based Image Retrieval", by Peter Howarth and Stefan Rüger, or
- "Textural features corresponding to visual perception" by Tamura H., Mori S., Yamawaki T. (IEEE Trans on Systems, Man and Cybernetics 8 (1978) 460-472).

By way of example, the texture characteristics may be: the coarseness, the contrast, the directionality, the line likeness, the regularity, the roughness, the co-occurrence, Tamura, Gabor filters, bloblikeness, homogeneity, softness, variance, entropy, etc.

In this way the following are obtained for each true face and false face:
- for the filtered image, that is to say for the complete face, reference texture characteristics and a reference coefficient "b" that are associated with the face, and
- for each filtered sub-image, that is to say for a specific region of the face, reference texture characteristics and a reference coefficient "b" that are associated with the corresponding region of the face.

From these reference elements (texture characteristics, coefficient "b", face region), it is possible to initialise a learning system such as a support vector machine (SVM), a neural network or a combination of several learning methods, introducing the features of the textures of the reference specularities, the reference coefficients "b" and the associated face region (the whole face, or a part of the face), with the true or false character of the corresponding face input to a learning system.

This learning makes it possible to create, for each face region (that is to say for the filtered image, and each filtered sub-image), a truth model based on the values of each reference texture characteristic, on the values of the reference coefficients "b" associated with said region of the face and on the correlations between these elements. Comparing the sets of values issuing from the elements of a face to be analysed with the truth model previously obtained will make it possible to decide whether the face is true or false.

According to one embodiment of the invention, with these elements and in a space with N dimensions, the learning system defines regions of the space corresponding to true faces and regions of the face corresponding to false faces, where each texture characteristic, the coefficient "b" and the region of the face each constitute one of said N dimensions. Each of these elements is therefore a coordinate in this space.

In a subsequent analysis, the texture characteristics, the coefficient "b" and the region of the face to be analysed define a point in said space. The decision is taken by decision taking means on the basis of the truth model issuing from the learning depending on whether the point is situated in a region corresponding to true faces or a region corresponding to false faces.

The truth models are connected together in a database of the detection device 100.

Figure 2:
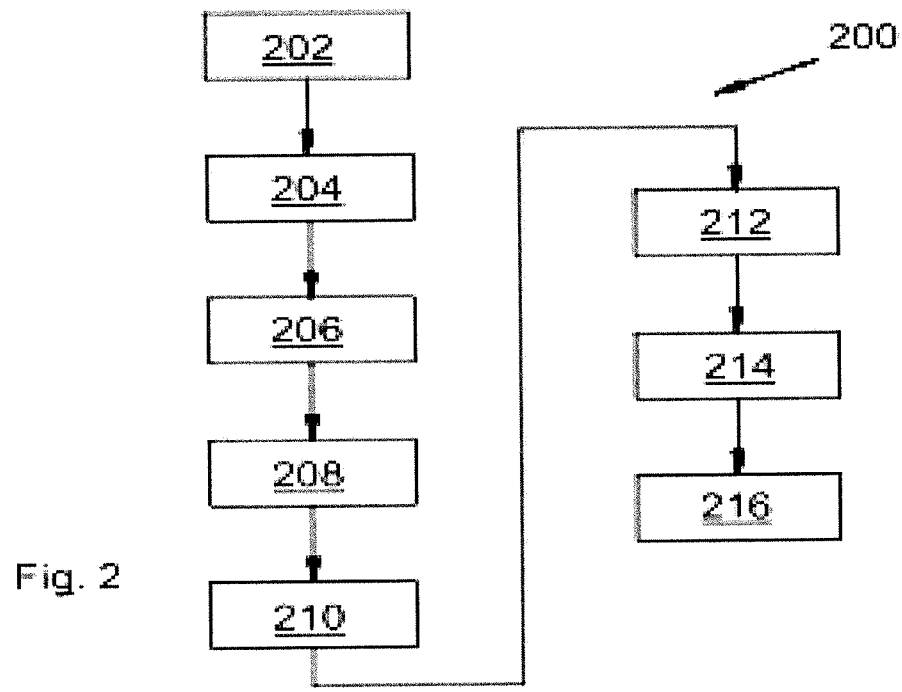
FIG. 2 is an algorithm of a method for detecting a true face according to the invention.

FIG. 2 shows an algorithm of a detection method 200 intended to determine whether the face 50 present in front of the detection device 100 is a true face or not.

The detection method 200 comprises:
- a capture step 202 during which a parallel image of the face 50 illuminated by the illumination means 101 is captured by the camera 110, and an orthogonal image of the face 50 illuminated by the illumination means 101 is captured by the camera 108,
- a difference step 204 during which the processing unit 118 computes a difference image resulting from the difference between the parallel image and the orthogonal image thus captured,
- a filtering step 206 during which the processing unit 118 generates a so-called filtered image by filtering said difference image by wavelet packets on 5 levels, eliminating firstly the "low" resolution and 1 levels for the purpose of eliminating defects in uniformity of the lighting, and secondly level 5 for the purpose of attenuating the noise,
- a division step 208 during which the processing unit 118 divides the image thus filtered into three filtered sub-images, the first filtered sub-image corresponding to the forehead, the second filtered sub-image corresponding to the nose and the third filtered sub-image corresponding to the cheeks,
- a processing step 210 during which the processing unit 118 subjects the filtered image and each of the filtered sub-images to a processing able to reveal the specularities of the surface of the face 50 that consists of:
  - a Fourier transformation or a discreet cosine transformation (DCT) in radial cumulative projection, by summing the energies belonging to the same frequency ring, for the purpose of defining a decreasing profile of the frequencies, and
  - a modelling of the frequency decrease profile in the form of a model of the power type (a.x^b+c) by a non-linear robust least squares method, and where the coefficient "b" is then characteristic of the frequency decrease.
- an extraction step 212 during which the processing unit 118 extracts, from the filtered image and each of the filtered sub-images, texture characteristics relating to the specularities of the surface of the face 50,
- an analysis step 214 during which the processing unit 118 analyses, for each region of the face, the coefficient "b" thus calculated and the texture characteristics thus extracted with respect to the truth model corresponding to said region of the face, and
- a decision-taking step 216 during which the processing unit 118 takes a decision concerning the veracity of the face 50 from the result of the analysis step 214.

The division step 208 is performed on the basis of the difference image by analysis and detection of the parts of the face, for example using so-called "tracking" software as presented in the document by C. Herold, V. Despiegel, S. Gentric, S. Dubuisson, I. Bloch under the title "Signal and image processing for biometrics" at the chapter "Modeling, reconstruction and tracking for face recognition" on pages 57-88 (A. Nait-Ali Ed., ISTE-Wiley). After detection of each of the parts (nose, forehead, cheeks), the difference image is divided around the parts thus detected.

The extraction step 212 consists of calculating the various texture characteristics relating to the specularities, as mentioned above.

The processing unit 118 comprises:
difference means provided for calculating the difference image by difference between the parallel image and the orthogonal image,
filtering means provided for generating a filtered image by filtering the difference image by wavelet packets on 5 levels, eliminating the "low" resolution levels 1 and 5,
division means provided for dividing the filtered image into three filtered sub-images, the first filtered sub-image corresponding to the forehead, the second filtered sub-image corresponding to the nose and the third filtered sub-image corresponding to the cheeks,
processing means for carrying out, on the filtered image and each of the filtered sub-images, processing able to reveal the specularities of the surface of the face 50, and comprising transformation means provided for producing a Fourier transform or a discreet cosine transform in radial cumulative projection, by summing the energies belonging to the same frequency ring, and modelling means provided for modelling the frequency decrease profile in the form of a model of the power type $(a.x^b+c)$ by a non-linear robust least squares method,
extraction means provided for extracting, from the filtered image in each of the filtered sub-images, texture characteristics relating to the specularities of the surface of the face 50,
analysis means provided for analysing, for each region of the face, the coefficient "b" calculated by the processing means and the texture characteristics extracted by the extraction means with respect to the truth model corresponding to said region of the face, issuing from the learning and stored in the database, and
decision-taking means provided for taking a decision concerning the veracity of the face 50 from information supplied by the analysis means.

Naturally the present invention is not limited to the examples and embodiments described and depicted but is capable of numerous variants accessible to persons skilled in the art.

The invention claimed is:

1. A method for detecting a true face by a detection device comprising at least one illuminator emitting an infrared flow polarised in a polarisation direction; a first camera having a filter polarising orthogonally to the polarisation direction and a second camera having a filter polarising parallel to the polarisation direction, a splitter blade placed between the face and the two cameras and dividing the light flow coming from the face into a light flow captured by at least one of the first or second camera and a light flow, a processor and a database containing, for each face region, a truth model based on reference texture characteristic values, on reference coefficient values "b" and on correlations between the reference coefficient "b" values, said detection method comprising:
capturing, by the second camera, a parallel image of the face illuminated by the at least one illuminator, and capturing, by the first camera, an orthogonal image of the face illuminated by the illuminator is captured by the first camera,
determining a difference image, by the processor, by determining the difference between the parallel image and the orthogonal image,
generating, by the processor, a filtered image by filtering said difference image in wavelet packets on 5 levels, eliminating the low resolution levels 1 and 5,
dividing, by the processor, the filtered image into three filtered sub-images comprising: a first sub-image of the three filtered sub-images corresponding to a forehead area, a second sub-image of the three filtered sub-images corresponding to a nose area, and a third sub-image of the three filtered sub-images corresponding to cheeks area,
extracting, from the filtered image and each of the filtered sub-images, texture characteristics relating to specularities of a surface of the face, the extracting performed by the processor,
analyzing, for each region of the face, the coefficient "b" thus calculated and the texture characteristics extracted compared with the truth model corresponding to said region of the face, the analyzing being performed by the processor, and
determining the veracity of the face from the result of the analysis step.

2. The method of claim 1, further comprising subjecting the filtered image and each of the filtered sub-images to a process comprising:
a Fourier transformation or a discreet cosine transformation in radial cumulative projection, by summing energies belonging to a common frequency range, defining a frequency decrease profile; and
modelling during which the frequency decrease profile is modelled in the form of a model of a power type.

3. A detection device comprising:
at least one illuminator emitting an infrared flow polarised in a polarisation direction,
a first camera having a filter polarising orthogonally to the polarisation direction,
a second camera having a filter polarising parallel to the polarisation direction,
a splitter blade placed between a face and the two cameras and divides the light flow coming from the face into a light flow captured by at least one of the first or second camera and a light flow captured by at least one of the first or second camera,
a database containing, for each face region, a truth model based on reference texture characteristic values, on reference coefficient "b" values and on correlations between the reference coefficient "b" values,
a computer processor that:
calculates a difference image resulting from the difference between the parallel image and the orthogonal image,
generates a filtered image by filtering the difference image in wavelet packets on 5 levels, eliminating low resolution levels 1 and 5,
divides the filtered image into three filtered sub-images comprising: a first sub-image of the three filtered sub-images corresponding to a forehead area, a second sub-image of the three filtered sub-images corresponding to a nose area, and a third sub-image of the three filtered sub-images corresponding to cheeks area,
extracts, from the filtered image and each of the filtered sub-images, texture characteristics relating to specularities of a surface of the face,
analyzing, for each region of the face, the coefficient "b" calculated by the processing means and the extracted texture characteristics compared with the truth model corresponding to said region of the face, issuing from the learning and stored in the database, and
determining a decision concerning the veracity of the face from information supplied during the analyzing.

* * * * *